(12) United States Patent
Senecal

(10) Patent No.: US 11,304,411 B2
(45) Date of Patent: Apr. 19, 2022

(54) SAFETY SYSTEM FOR A FISH-TANK SIPHON

(71) Applicant: Natalie Senecal, Miami, FL (US)

(72) Inventor: Natalie Senecal, Miami, FL (US)

( * ) Notice: Subject to any disclaimer, the term of this patent is extended or adjusted under 35 U.S.C. 154(b) by 0 days.

(21) Appl. No.: 16/982,492

(22) PCT Filed: Mar. 22, 2019

(86) PCT No.: PCT/IB2019/052370
§ 371 (c)(1),
(2) Date: Sep. 18, 2020

(87) PCT Pub. No.: WO2019/180687
PCT Pub. Date: Sep. 26, 2019

(65) Prior Publication Data
US 2021/0015080 A1    Jan. 21, 2021

Related U.S. Application Data

(60) Provisional application No. 62/646,616, filed on Mar. 22, 2018.

(51) Int. Cl.
*A01K 63/04* (2006.01)
*B01D 29/33* (2006.01)
*F04F 10/00* (2006.01)

(52) U.S. Cl.
CPC ............ *A01K 63/045* (2013.01); *B01D 29/33* (2013.01); *F04F 10/00* (2013.01); *B01D 2201/184* (2013.01); *B01D 2201/40* (2013.01)

(58) Field of Classification Search
CPC ...... A01K 63/045; A01K 63/04; B01D 29/33; B01D 2201/40; B01D 2201/184; B01D 35/02; B01D 35/04; B01D 35/0276; B01D 35/046; B01D 29/00; B01D 29/0029; F04F 10/00
USPC .......... 210/460, 163, 167.21, 439, 446, 449, 210/416.2, 154, 258, 416.1, 459, 448
See application file for complete search history.

(56) References Cited

U.S. PATENT DOCUMENTS

| 3,321,081 A | 5/1967 | Willinger |
| 3,783,888 A | 1/1974 | Johnson |
| 5,919,359 A | 7/1999 | Bisseker |
| 6,051,132 A | 4/2000 | Flores |

(Continued)

*Primary Examiner* — Madeline Gonzalez

(57) ABSTRACT

A safety system for a fish-tank siphon is an apparatus used to prevent suction of a fish-tank-cleaning siphon from becoming obstructed by fish, underwater plant life, rocks, or other large tank contaminants. The apparatus is configured to protect the intake by preventing potential obstructions from entering the siphon at all. The apparatus includes a grate, a mating mechanism, and a siphon inlet. The grate acts as a protective filter, preventing large items from entering a connected fish-tank-cleaning siphon. The mating mechanism allows for connection of the present invention to a fish-tank-cleaning siphon. The siphon inlet is a section of the fish-tank-cleaning siphon through which the vacuum is applied in order to remove dirty water and water contaminants. The general configuration of these components allows the apparatus to prevent a fish-tank-cleaning siphon from incidentally collecting fish or other underwater creatures, plant life, pebbles, or other contaminants while vacuum-cleaning a fish tank.

8 Claims, 8 Drawing Sheets

(56) References Cited

U.S. PATENT DOCUMENTS 6,375,698 B1* 4/2002 Clements .......... B01D 46/0021
                                                55/341.1
2015/0377256 A1* 12/2015 Liu ..................... F04D 29/18
                                                210/143

* cited by examiner

SAFETY SYSTEM FOR A FISH-TANK SIPHON

The current application is a 371 of international Patent Cooperation Treaty (PCT) application PCT/IB2019/052370 filed on Mar. 22, 2019. The PCT application PCT/IB2019/052370 claims a priority to a U.S. provisional application Ser. No. 62/646,616 filed on Mar. 22, 2018.

FIELD OF THE INVENTION

The present invention generally relates to fish tank accessories. More specifically, a safety system for a fish-tank siphon protects contained fish from being sucked into a water cleaning siphon during regular tank maintenance.

BACKGROUND OF THE INVENTION

Due to ease of care, visual appeal, and more, fish are among the more popular pets in the world. It is common to find a fish tank or container in both residential as well as commercial locations, from office buildings to households. Many fish owners are aware that fish tanks require occasional maintenance in order to preserve the necessary conditions for underwater life. Many devices and accessories have been developed to address tank and water cleanliness for easier, quicker, more efficient maintenance of fish tanks. Among the most commonly used maintenance tools are suction-based cleaning devices. Removal of animal waste and debris from gravel and the bottom surface of the fish tank is important to maintain a natural balance in the water, especially since tank water is oftentimes stagnant. Particularly, fish tank siphons are useful for removing dirty or contaminated water from clean water. Generally, fish tank siphons comprise a flexible tubular body connected to a wide cylindrical end. By squeezing the flexible tubular body and inserting the wide cylindrical end into the water before releasing, a vacuum is created that leads water from the wide cylindrical end through and out the flexible tubular body. However, the current design of most fish tank siphons can be a hazard to the fish in the fish tank. It is not uncommon for fish to get sucked into the siphon, damaging the fish body or fins. Consideration for the danger potential can make tank cleaning a tedious process, as users have to either remove the fish before cleaning the tank or slowly clean the tank using the siphon. Furthermore, a fish in the wide end of the fish tank siphon can block the connection between the flexible tubing and the wide end, thus preventing suction from occurring. What is needed is a device which safely filters fish out away from the wide opening of a fish tank siphon.

An objective of the present invention is to provide a safety system for a fish-tank siphon which addresses the aforementioned issues. The present invention is a safety device which prevents fish or other aquatic life in a fish tank from being accidentally sucked into a fish tank siphon during the tank-cleaning process. Such a device facilitates the tank-cleaning process, making it easier, faster, and safer for the aquatic inhabitants of the fish tank. The present invention can be provided as an attachment for fish tank siphons or as a component integrated into the body of a fish tank siphon. As an attachment, an edge is wrapped around the body of a fish tank siphon to retain the position of the present invention relative to a fish tank siphon. As an integrated component, an edge allows the present invention to be removed so the fish tank siphon can be cleaned. A flexible body has an opening which matches the opening of a fish tank siphon. The flexibility of the flexible body improves the ability of the present invention to fit within the wide end of the fish tank siphon. A plurality of openings is arranged around the flexible body to allow waste, debris, and other water contaminants to be sucked into the body of the siphon. The present invention can be made from various materials appropriate for fish tank environments.

DETAILED DESCRIPTION OF THE INVENTION

All illustrations of the drawings are for the purpose of describing selected versions of the present invention and are not intended to limit the scope of the present invention.

Figure 1:
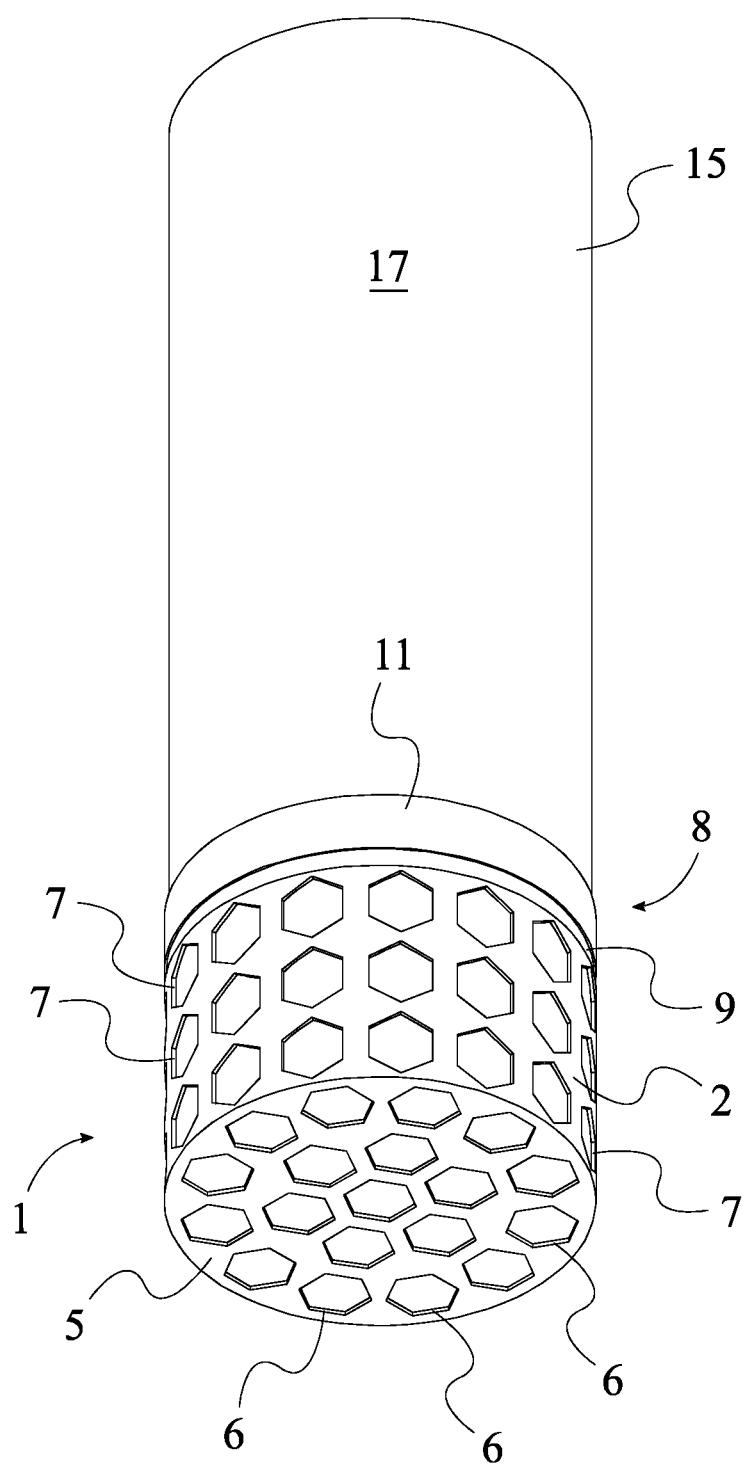
FIG. 1 is a bottom-front perspective view of the present invention.
Figure 6:
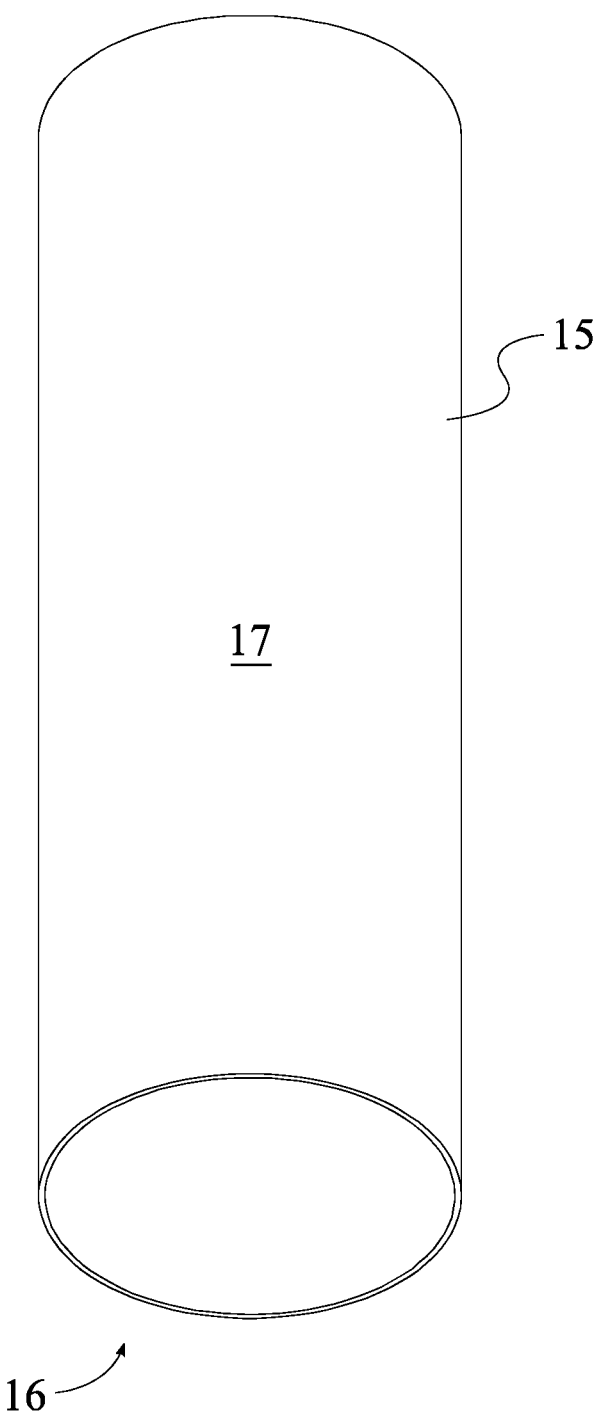
FIG. 6 is a bottom-front perspective view of the siphon inlet.

The present invention is a safety system for a fish-tank siphon that is used to prevent suction of a fish-tank-cleaning siphon from becoming obstructed by fish, underwater plant life, rocks, or other large tank contaminants. The present invention is configured to protect the intake by preventing potential obstructions from entering the siphon at all. The present invention comprises a grate 1, a mating mechanism 8, and a siphon inlet 15, as seen in FIG. 1. The grate 1 is a protective unit that acts as a protective filter, preventing large items from entering a connected fish-tank-cleaning siphon. The mating mechanism 8 is a set of components that allows for connection of the present invention to a fish-tank-cleaning siphon. The siphon inlet 15 is a section of the fish-tank-cleaning siphon through which the vacuum is applied in order to remove dirty water and water contaminants. The siphon inlet 15 comprises an inlet opening 16 and an inlet body 17, as seen in FIG. 6. The inlet body 17 represents the physical volume occupied by the siphon inlet 15. The inlet opening 16 is a space through which the fish-tank-cleaning siphon may collect dirty water and contaminants.

Figure 2:
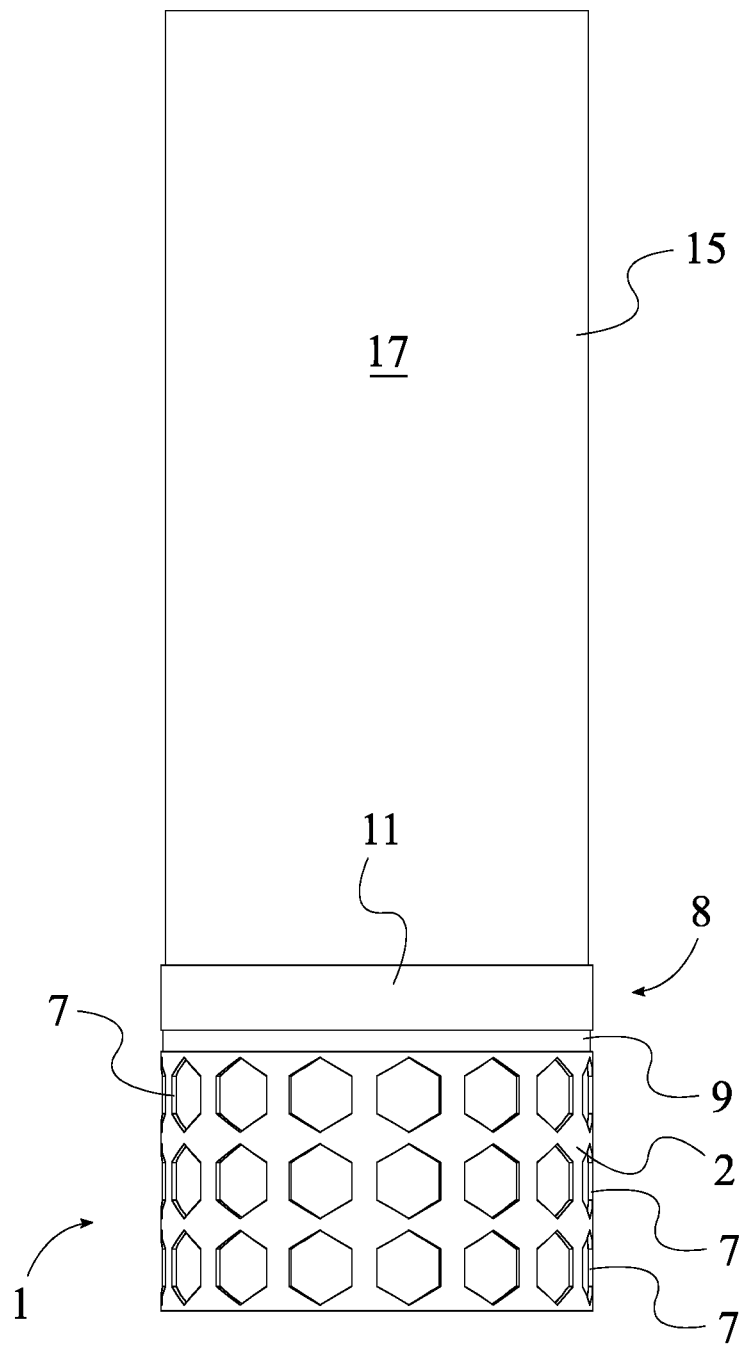
FIG. 2 is a front perspective view of the present invention.

The general configuration of the aforementioned components allows the present invention to efficiently and effectively protect a fish-tank-cleaning siphon from collecting fish or other underwater creatures, plant life, pebbles, or other potential contaminants from obstructing the vacuum of the fish-tank-cleaning siphon. The grate 1 is positioned across the inlet opening 16, as seen in FIG. 2. This arrangement ensures that the grate 1 is in position to filter vacuumed inputs from the inlet opening 16. The grate 1 is perimetrically and hermetically connected to the inlet body 17 by the mating mechanism 8. In this way, no contaminants can enter the inlet opening 16 without passing through the grate 1, and the mating mechanism 8 is able to secure the grate 1 to the inlet body 17 so that the grate 1 is not dislodged from the inlet body 17 during usage of the present invention.

Oftentimes, it is advantageous for the present invention to be utilized as a secure addition to a fish-tank-cleaning siphon. To this end, the grate 1 may be integrated into the inlet body 17 by the mating mechanism 8, as seen in FIG. 2. In other words, the grate 1 is made as a part of the mating mechanism 8. Such an arrangement allows the grate 1 to retain its position relative to the inlet body 17. Further, integration results in consistent positioning of the grate 1 relative to the inlet opening 16.

Figure 5:
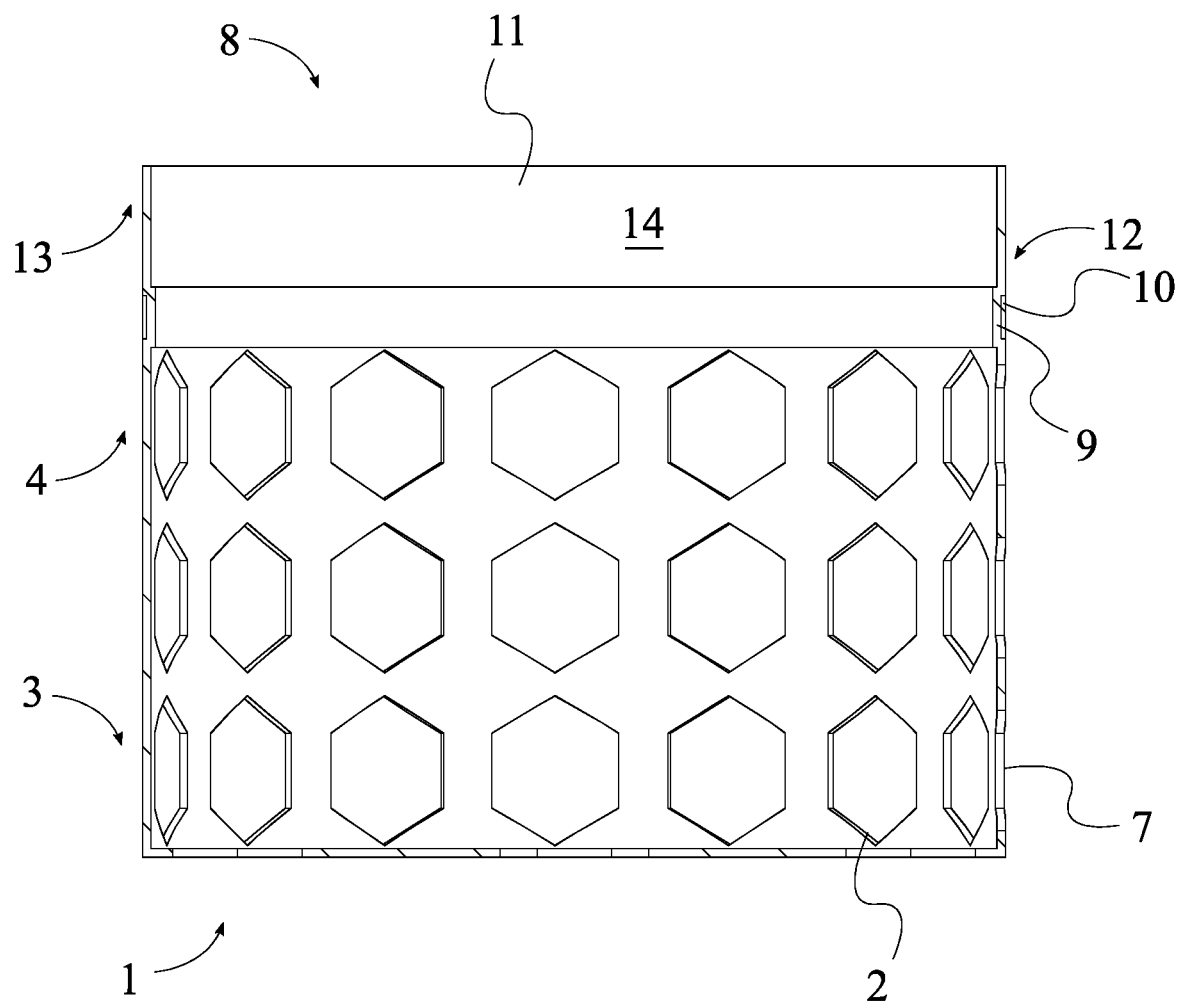
FIG. 5 is a right cross-sectional view taken about line 5-5 in FIG. 4 of the grate and the mating mechanism.

In an exemplary embodiment, the present invention benefits from being removable for cleaning and maintenance purposes. In order to accommodate such advantages, the mating mechanism 8 comprises an elastic band 10 and a band channel 9, as seen in FIG. 5. The elastic band 10 is a rubber or other elastic polymeric material that allows for connection of the mating mechanism 8 to the inlet body 17. The band channel 9 is a groove integrated into the grate 1 that allows for containment and arrangement of the elastic band 10. The band channel 9 is peripherally integrated into the grate 1. This arrangement allows connection of the band channel 9 to the inlet body 17 to result in positioning of the grate 1. The band channel 9 is tensionably engaged by the elastic band 10. In this way, the elastic band 10 may apply compressive force to position the grate 1 appropriately.

Figure 3:
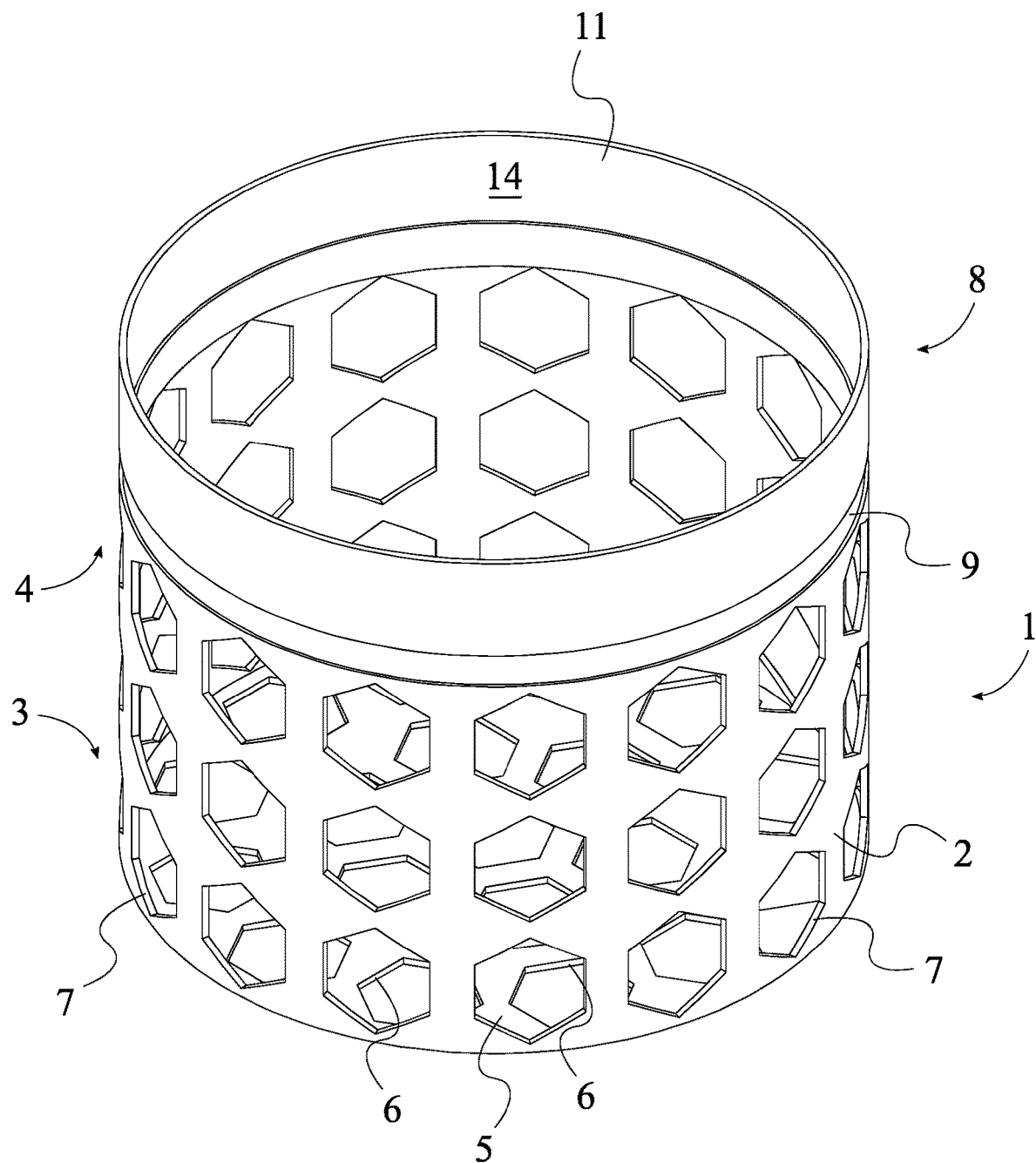
FIG. 3 is a top-front perspective view of the grate and the mating mechanism.

The mating mechanism 8 requires components that allow for attachment of the present invention to the inlet body 17. To this end, the mating mechanism 8 may comprise a flexible rim 11, as seen in FIG. 3. The flexible rim 11 is an edge of the mating mechanism 8 that bends to enable friction fitting of the mating mechanism 8 relative to the inlet body 17. The flexible rim 11 comprises a fixed rim end 12, a free rim end 13, and a rim inner surface 14. The fixed rim end 12 is the segment of the mating mechanism 8 that connects to the grate 1. The free rim end 13 is the segment of the mating mechanism 8 opposite the fixed rim end 12 that is not connected to the grate 1. The rim inner surface 14 is a generally cylindrical portion of the flexible rim 11 that allows for contact with the inlet body 17. The fixed rim end 12 is peripherally integrated into the grate 1. In this way, the fixed rim end 12 is translationally engaged to the grate 1. The siphon inlet 15 traverses into the flexible rim 11 through the free rim end 13. This arrangement allows for engagement of the siphon inlet 15 with the free rim end 13. The siphon inlet 15 is pressed against the rim inner surface 14. In this way, the hermetic seal of the mating mechanism 8 to the inlet body 17 is enhanced.

Figure 8:
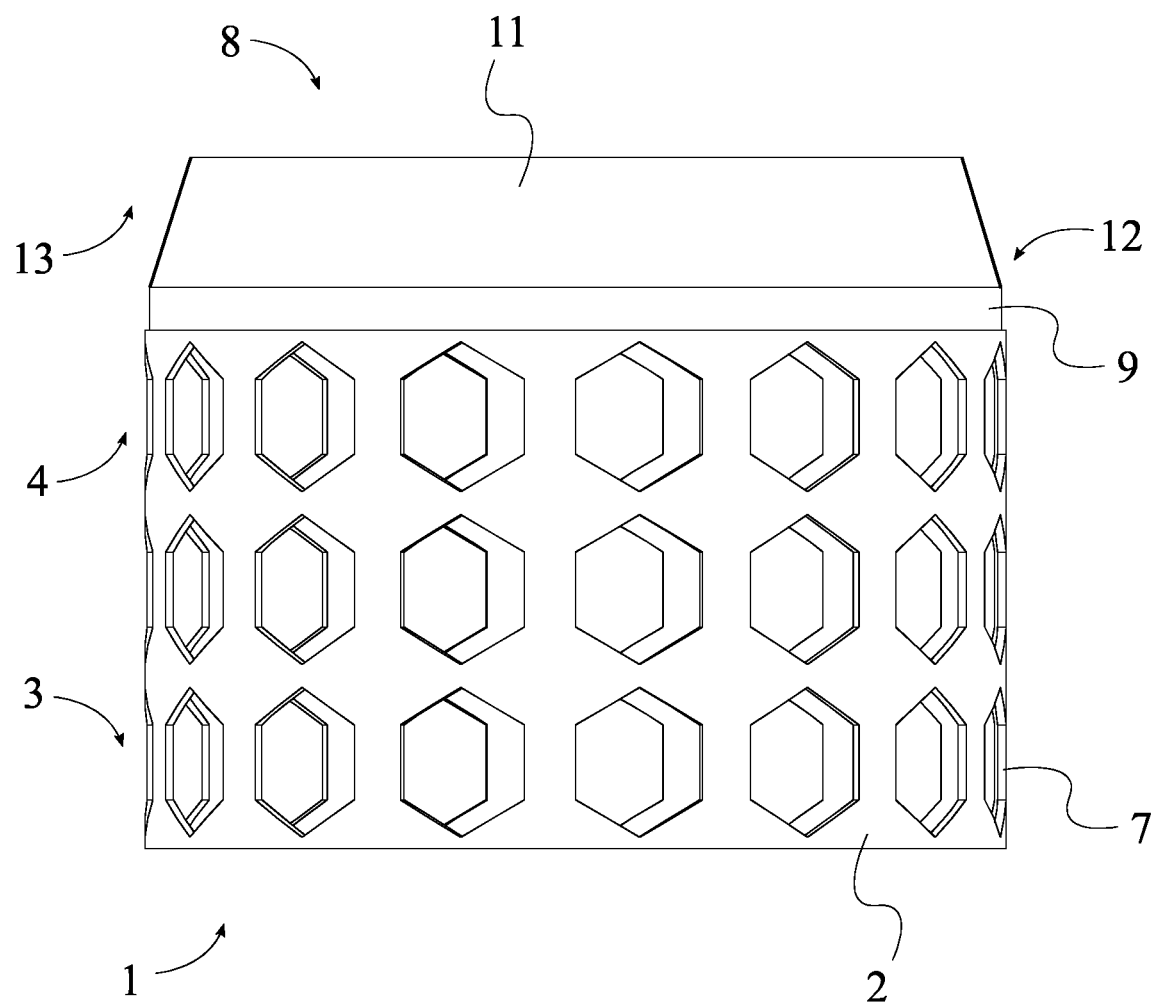
FIG. 8 is a front perspective view of a flexible rim tapering from a free rim end to a fixed rim end.

The flexible rim 11 preferably tapers from the free rim end 13 to the fixed rim end 12, as seen in FIG. 8. This arrangement minimizes the potential for accidental dislodging of the grate 1 from the siphon inlet 15. Simultaneously, the tapering enhances the ability of the user to grasp the fixed rim end 12, thus improving the ability of the user to remove the grate 1 from the siphon inlet 15.

The grate 1 must be prepared to filter large potential contaminants, such as fish, leaves, pebbles, and other large items from entering the siphon inlet 15. To this end, the grate 1 comprises a tubular barrier 2 and a base barrier 5, as seen in FIG. 3. The tubular barrier 2 is a generally cylindrical segment that allows for positioning of the base barrier 5. The base barrier 5 is a generally flat semirigid segment that allows for filtering and subsequent removal of large potential obstructions. The base bather 5 is in fluid communication with the inlet opening 16 through the tubular bather 2. In this way, the base barrier 5 is selectively permeable by smaller particles, preventing larger particles from entering the siphon inlet 15.

Figure 4:
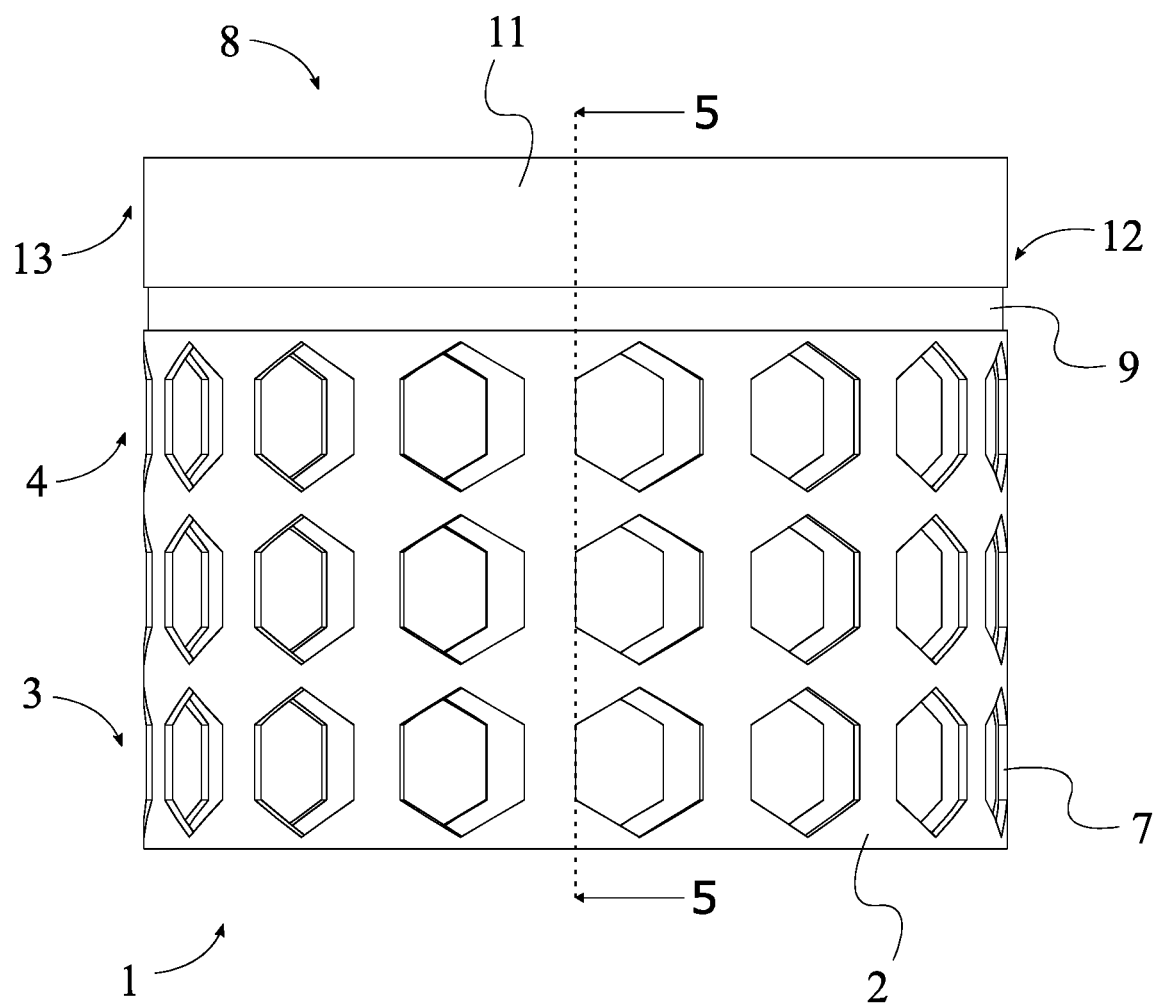
FIG. 4 is a front perspective view of the grate and the mating mechanism.

The tubular barrier 2 is optimally equipped to arrange the base barrier 5 appropriately within or relative to the siphon inlet 15. The tubular barrier 2 thus comprises a first open end 3 and a second open end 4, as seen in FIG. 4. The first open end 3 is a semirigid segment of the tubular barrier 2 that is positioned opposite the similarly semirigid second open end 4. The first open end 3 is peripherally connected to the base barrier 5. This arrangement allows the first open end 3 to position the base barrier 5 appropriately relative to the siphon inlet 15. The second open end 4 is hermetically connected to the inlet opening 16 by the mating mechanism 8. In this way, the second open end 4 prevents large potential obstructions from entering the siphon inlet 15 around the grate 1.

The grate 1 is the primary filter through which fluids and particles may enter the siphon inlet 15. To enhance the ability of the grate 1 to perform this task, the grate 1 further comprises a plurality of base holes 6, as seen in FIG. 1. The plurality of base holes 6 is a set of cuts into the base barrier 5 through which suction may be applied to proximal debris. The plurality of base holes 6 traverses through the base barrier 5. This arrangement allows for dirty tank water to flow through the plurality of base holes 6 and into the siphon inlet 15. The plurality of base holes 6 is positioned normal to the base barrier 5. Furthermore, the plurality of base holes 6 is distributed across the base barrier 5. This arrangement optimizes the surface area covered by the plurality of base holes 6, as well as the maximum flux of water through the plurality of base holes 6.

The grate 1 may be further equipped to allow for alternative entrance of contaminated water into the siphon inlet 15. To this end, the grate 1 further comprises a plurality of tube holes 7, as seen in FIG. 5. The plurality of tube holes 7 is a set of cuts into the tubular barrier 2 through which suction may be applied to proximal debris. The plurality of tube holes 7 traverses through the tubular barrier 2. This arrangement allows for dirty tank water to flow through the plurality of tube holes 7 and into the siphon inlet 15. The plurality of tube holes 7 is positioned perpendicular to the tubular barrier 2. Furthermore, the plurality of tube holes 7 is distributed along and about the tubular barrier 2. This arrangement optimizes the surface area covered by the plurality of tube holes 7, as well as the maximum flux of water through the plurality of tube holes 7.

Figure 7:
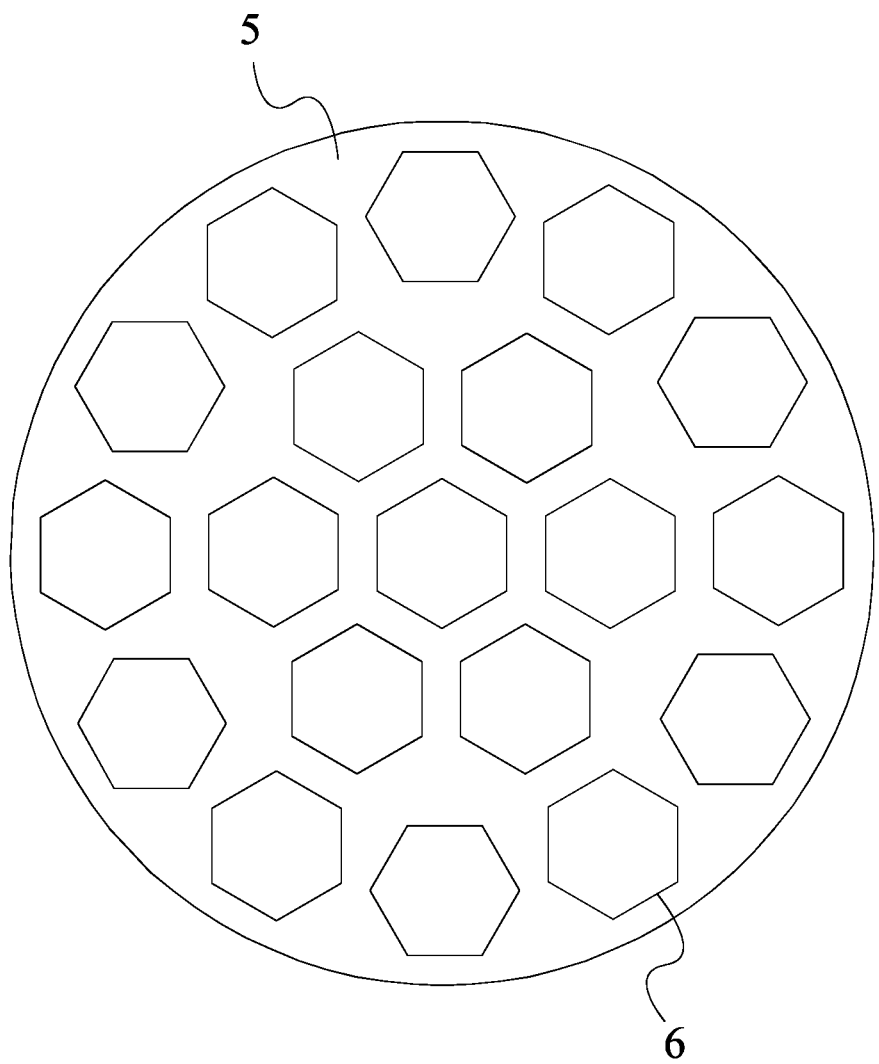
FIG. 7 is a bottom perspective view of the grate.

In an exemplary embodiment, the grate 1 is configured in a honeycomb arrangement, as seen in FIG. 7. This arrangement maximizes both the structural integrity of the grate 1 as well as the amount of open space through which contaminated water may flow through the siphon inlet 15. The honeycomb arrangement results in a hexagonal deployment of the plurality of base holes 6. The plurality of base holes 6 further allows for improved fluid flux through the base barrier 5 by being hexagonally-shaped. Such an arrangement allows for optimal clustering of the plurality of base holes 6 across the base barrier 5.

Although the invention has been explained in relation to its preferred embodiment, it is to be understood that many other possible modifications and variations can be made without departing from the spirit and scope of the invention as hereinafter claimed.

What is claimed is:

1. A safety system for a fish-tank siphon comprises:
   a grate;
   a mating mechanism;
   a siphon inlet;
   the siphon inlet comprises an inlet opening and an inlet body;

the mating mechanism comprises an elastic band and a band channel;
the grate being positioned across the inlet opening;
the grate being perimetrically and hermetically connected to the inlet body by the mating mechanism;
the band channel being peripherally integrated into the grate;
the band channel being tensionably engaged by the elastic band;
the mating mechanism comprises a flexible rim;
the flexible rim comprises a fixed rim end, a free rim end, and a rim inner surface;
the fixed rim end being peripherally integrated into the grate;
the siphon inlet traversing into the flexible rim through the free rim end;
the siphon inlet being pressed against the rim inner surface;
the flexible rim tapering from the free rim end to the fixed rim end;
the grate comprises a tubular barrier and a base barrier;
the base barrier being in fluid communication with the inlet opening through the tubular barrier;
the tubular barrier comprises a first open end and a second open end;
the first open end being peripherally connected to the base barrier;
the second open end being hermetically connected to the inlet opening by the mating mechanism; and
the grate being configured in a honeycomb arrangement.

2. The safety system for a fish-tank siphon as claimed in claim 1 comprises:
the grate further comprises a plurality of base holes;
the plurality of base holes traversing through the base barrier;
the plurality of base holes being positioned normal to the base barrier; and
the plurality of base holes being distributed across the base barrier.

3. The safety system for a fish-tank siphon as claimed in claim 1 comprises:
the grate further comprises a plurality of tube holes;
the plurality of tube holes traversing through the tubular barrier;
the plurality of tube holes being positioned perpendicular to the tubular barrier; and
the plurality of tube holes being distributed along and about the tubular barrier.

4. A safety system for a fish-tank siphon comprises:
a grate;
a mating mechanism;
a siphon inlet;
the siphon inlet comprises an inlet opening and an inlet body;
the mating mechanism comprises a flexible rim;
the grate being positioned across the inlet opening;
the grate being perimetrically and hermetically connected to the inlet body by the mating mechanism;
the flexible rim comprises a fixed rim end, a free rim end, and a rim inner surface;
the fixed rim end being peripherally integrated into the grate;
the siphon inlet traversing into the flexible rim through the free rim end;
the siphon inlet being pressed against the rim inner surface;
the flexible rim tapering from the free rim end to the fixed rim end;
the grate comprises a tubular barrier and a base barrier;
the base barrier being in fluid communication with the inlet opening through the tubular barrier;
the tubular barrier comprises a first open end and a second open end;
the first open end being peripherally connected to the base barrier;
the second open end being hermetically connected to the inlet opening by the mating mechanism; and
the grate being configured in a honeycomb arrangement.

5. The safety system for a fish-tank siphon as claimed in claim 4, wherein the grate is integrated into the inlet body by the mating mechanism.

6. The safety system for a fish-tank siphon as claimed in claim 4 comprises:
the mating mechanism comprises an elastic band and a band channel;
the band channel being peripherally integrated into the grate; and
the band channel being tensionably engaged by the elastic band.

7. The safety system for a fish-tank siphon as claimed in claim claim 4 comprises:
the grate further comprises a plurality of base holes;
the plurality of base holes traversing through the base barrier;
the plurality of base holes being positioned normal to the base barrier; and
the plurality of base holes being distributed across the base barrier.

8. The safety system for a fish-tank siphon as claimed in claim 4 comprises:
the grate further comprises a plurality of tube holes;
the plurality of tube holes traversing through the tubular barrier;
the plurality of tube holes being positioned perpendicular to the tubular barrier; and
the plurality of tube holes being distributed along and about the tubular barrier.

* * * * *